United States Patent

Hayashi et al.

[11] Patent Number: 5,941,610
[45] Date of Patent: Aug. 24, 1999

[54] TANDEM VACUUM SERVO UNIT FOR A VEHICLE BRAKING SYSTEM

[75] Inventors: Kenji Hayashi, Toyoake; Kazuhiko Suzuki, Kariya; Satoshi Kawasumi, Takahama; Yuzuru Sugiura, Anjo, all of Japan

[73] Assignee: Aisin Seiki Kabushiki Kaisha, Kariya, Japan

[21] Appl. No.: 08/791,561

[22] Filed: Jan. 31, 1997

[30] Foreign Application Priority Data

Jan. 31, 1996 [JP] Japan .................................. 8-015564

[51] Int. Cl.⁶ .......................... F15B 9/10; B60T 13/563; B60T 13/565
[52] U.S. Cl. .................. 303/114.3; 91/369.1; 91/376 R; 92/98 D; 92/48
[58] Field of Search ........................ 303/114.3; 188/356; 92/48, 98 D, 98 R; 91/369.1, 369.2, 376 R

[56] References Cited

U.S. PATENT DOCUMENTS

| | | | |
|---|---|---|---|
| 4,729,287 | 3/1988 | Boehm et al. | 91/369.2 |
| 5,062,348 | 11/1991 | Gotoh et al. | 92/98 D |
| 5,259,292 | 11/1993 | Sunohara et al. | 92/98 R |
| 5,507,216 | 4/1996 | Suwa | 91/369.1 |
| 5,564,325 | 10/1996 | Satoh | 91/369.1 |
| 5,664,479 | 9/1997 | Miwa | 91/376 R |
| 5,704,455 | 1/1998 | Watanabe | 92/48 |

FOREIGN PATENT DOCUMENTS

| | | |
|---|---|---|
| 40 05 584 | 9/1991 | Germany . |
| 56-99849 | 8/1981 | Japan . |
| 6-9961 | 2/1994 | Japan . |
| 2 241 293 | 8/1991 | United Kingdom . |

*Primary Examiner*—Chris Schwartz
*Attorney, Agent, or Firm*—Burns, Doane, Swecker & Mathis, LLP

[57] ABSTRACT

A tandem vacuum servo unit includes a movable power piston having a supporting portion and a front movable wall member having a first engaging portion for engaging the movable power piston. The first engaging portion has an input side face that engages the output side face of the supporting portion along a first contacting portion. A rear movable wall member has a second engaging portion whose input side face engages the output side face of the first engaging portion along a second contacting portion. The first contacting portion is spaced radially outwardly of the second contacting portion. This construction of the vacuum servo unit increases the durability of the front movable wall member.

16 Claims, 5 Drawing Sheets

TANDEM VACUUM SERVO UNIT FOR A VEHICLE BRAKING SYSTEM

FIELD OF THE INVENTION

The present invention generally relates to braking or clutch systems and more particularly concerns a tandem vacuum servo unit for a vehicle braking system or a clutch system.

BACKGROUND OF THE INVENTION

A conventional tandem vacuum servo unit is disclosed in Japanese Patent Laid-Open Publication No. 6-009961. This vacuum servo unit includes a housing in which is defined a pressure chamber, and a partition wall member provided in the housing to divide the pressure chamber into a front pressure chamber and a rear pressure chamber, the partition wall member being fixed in an air tight manner to the housing at the outer peripheral portion of the wall member. A movable power piston slides in an air tight manner on the inner peripheral portion of the partition wall member at an outer peripheral portion thereof.

A front movable wall member is disposed concentrically with the partition wall member in the front pressure chamber to divide the front pressure chamber into a front constant pressure chamber and a front variable pressure chamber, and a rear movable wall member is disposed concentrically with the partition wall member in the rear pressure chamber to divide the rear pressure chamber into a rear constant pressure chamber and a rear variable pressure chamber. An input member is provided in the movable power piston to move axially upon brake actuation, and an output member outputs a propulsion force generated by the movable power piston accompanying movement of the front and rear movable wall members.

A control member selectively communicates the front and rear variable pressure chambers with the negative pressure source or with atmosphere according to movement of the input member against the movable power piston. The movable power piston has a supporting portion on the outer peripheral portion thereof. An input side face of the supporting portion is perpendicular to the axis of the movable power piston.

The front constant pressure chamber is located in front of the front movable wall member and is communicated with a negative pressure source while the front variable pressure chamber is located behind the front movable wall member and is selectively communicated with atmosphere and the negative pressure source. The rear constant pressure chamber is located in front of the rear movable wall member and is communicated with the negative pressure source while the rear variable pressure chamber is located behind the rear movable wall member and is selectively communicated with atmosphere and the negative pressure source. A first engaging portion is disposed with an inner peripheral portion of the front movable wall member for engaging the supporting portion. The first engaging portion has a connecting portion engaged with the input side face of the supporting portion at an output side face thereof. The connecting portion is shaped to be straight so as to be parallel to the input side face of the supporting portion. A second engaging portion is disposed with an inner peripheral portion of the rear movable wall member for engaging an input side face of the first engaging portion at an output side face thereof. The second engaging portion is shaped to be straight so as to be parallel to the connecting portion.

In this vacuum servo unit, when the input member is moved by brake actuation, the control member cuts off communication between the front and rear variable pressure chambers and the negative pressure source, and communicates the front and rear variable pressure chambers with the atmosphere. Therefore, a pressure differential is generated between the variable pressure chambers and the constant pressure chambers. This pressure differential acts on the movable wall members, the movable power piston, and the output member.

In the vacuum servo unit described above, the first engaging portion is generally formed by pressing. If the first engaging portion is press formed with little manufacturing precision, it is possible that the connecting portion will not be parallel to the input side face of the supporting portion, i.e., the contact between the supporting portion and the connecting portion does not occur between the input side face of the supporting member and the output side face of the first engaging portion, but rather occurs between the input side face of the supporting portion and an edge of the connecting portion. Therefore, when the pressure differential is generated between the front constant pressure chamber and the front variable pressure chamber to move the movable power piston towards the output side through the front movable wall member, a large load is generated at the first engaging portion, i.e., the front movable wall member, which decreases the durability of the front movable wall member.

SUMMARY OF THE INVENTION

Accordingly, a need exists for a tandem vacuum servo unit that is able to overcome the aforementioned drawback associated with conventional vacuum servo units. That is, a need exists for a vacuum servo unit that is designed to increase the durability of the front movable wall member.

In light of the foregoing, an aspect of the present invention involves a tandem vacuum servo unit for a vehicle braking system that includes a housing in which is defined a pressure chamber, a partition wall member provided in the housing to divide the pressure chamber into a front pressure chamber and a rear pressure chamber, a movable power piston has a supporting portion provided on the outer peripheral portion of the movable power piston. A front movable wall member is disposed concentrically with the partition wall member in the front pressure chamber to divide the front pressure chamber into a front constant pressure chamber and a front variable pressure chamber. A first engaging portion is disposed at an inner peripheral portion of the front movable wall member for engaging the supporting portion along a second contacting portion, with the first engaging portion having an output side face that engages an input side face of the supporting portion. A rear movable wall member is disposed concentrically with the partition wall member in the rear pressure chamber to divide the rear pressure chamber into a rear constant pressure chamber and a rear variable pressure chamber. A second engaging portion is disposed at the inner peripheral portion of the rear movable wall member and engages an input side face of the first engaging portion along a second contacting portion, the first contacting portion being located radially outwardly of the second contacting portion. An input member is disposed in the movable power piston and is axially movable upon brake actuation, and an output member outputs a propulsion force generated by the movable power piston accompanying movement of the front and rear movable wall members. A control member selectively communicates the front and rear variable pressure chambers with the negative pressure source or with the atmosphere according to movement of the input member against the movable power piston.

According to another aspect of the invention, a tandem vacuum servo unit for a vehicle braking system includes a housing in which is defined a pressure chamber, a partition wall member provided in the housing to divide the pressure chamber into a front pressure chamber and a rear pressure chamber, a movable power piston has a supporting portion provided on the outer peripheral portion of the movable power piston. A front movable wall member is disposed in the front pressure chamber to divide the front pressure chamber into a front constant pressure chamber and a front variable pressure chamber. A first engaging portion is disposed at the inner peripheral portion of the front movable wall member for engaging the supporting portion along a first contacting portion. A rear movable wall member is disposed in the rear pressure chamber to divide the rear pressure chamber into a rear constant pressure chamber communicable with the negative pressure source and a rear variable pressure chamber selectively communicable with atmosphere and the negative pressure source. A second engaging portion is disposed at the inner peripheral portion of the rear movable wall member and is engaged with the input side face of the first engaging portion. The second engaging portion is spaced from the supporting portion in a region between the first contacting portion and the inner peripheral edge of the first engaging portion. An axially movable input member is disposed in the movable power piston, an output member outputs a propulsion force generated by the movable power piston accompanying movement of the front and rear movable wall members, and a control member selectively communicates the front and rear variable pressure chambers with the negative pressure source or with the atmosphere according to movement of the input member against the movable power piston.

In the vacuum servo unit of the present invention, since the front movable wall member is engaged with the supporting portion of the movable power piston by the contact between the input side face of the supporting portion and the output side face of the connecting portion of the first engaging portion, a large load is not generated in the front movable wall member. Thus, the durability of the front movable wall member is increased.

BRIEF DESCRIPTION OF THE DRAWING FIGURES

The foregoing and other features will become more readily apparent from the following detailed description considered with reference to the accompanying drawing figures in which like elements are designated by like reference numerals and wherein.

DETAILED DESCRIPTION OF THE PREFERRED EMBODIMENT

Figure 1:
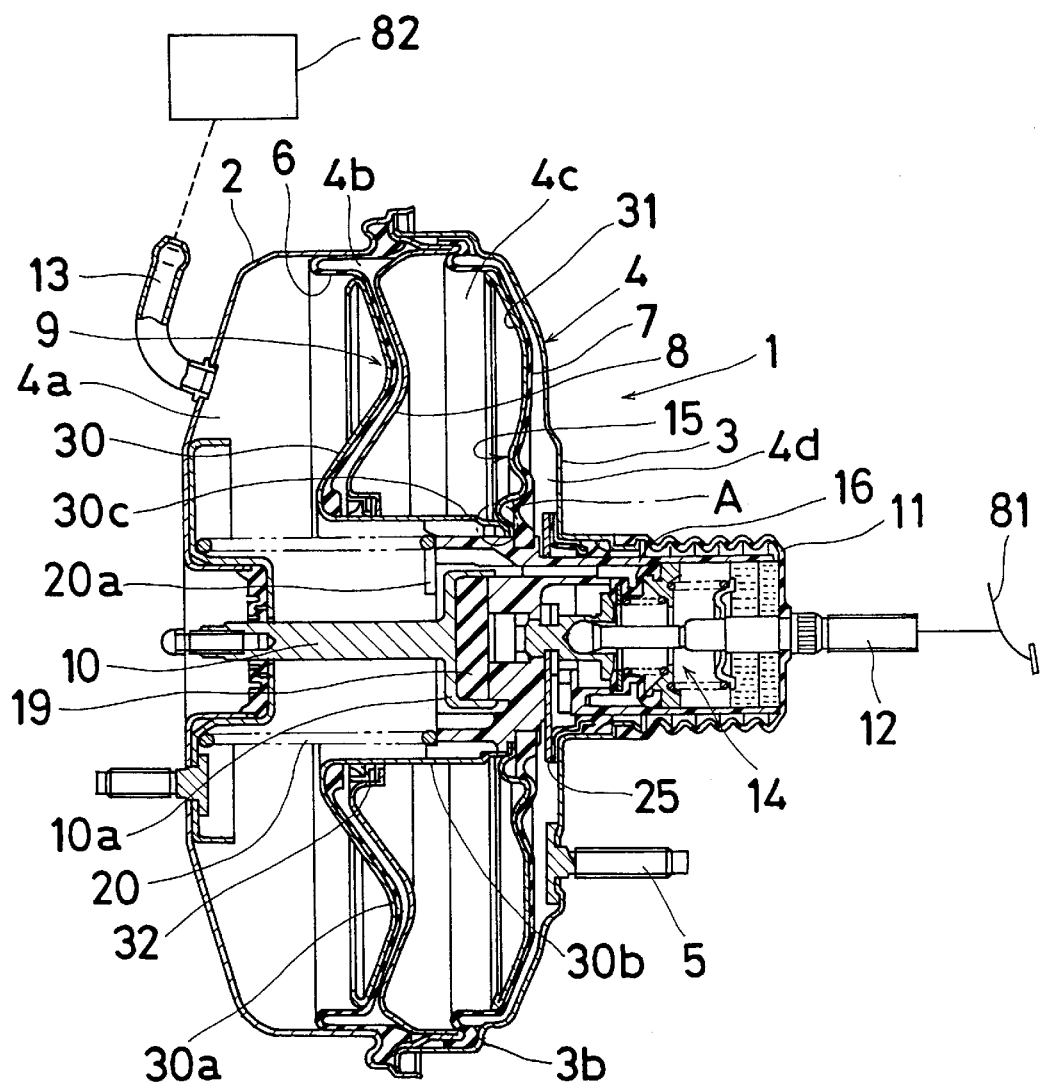
FIG. 1 is a cross-sectional view of a tandem vacuum servo unit according to an embodiment of the present invention.

Referring to FIG. 1, a tandem vacuum servo unit 1 according to an embodiment of the present invention includes a housing 4 that is comprised of a front shell 2 and a rear shell 3. The interior of the housing defines a pressure chamber.

Figure 2:
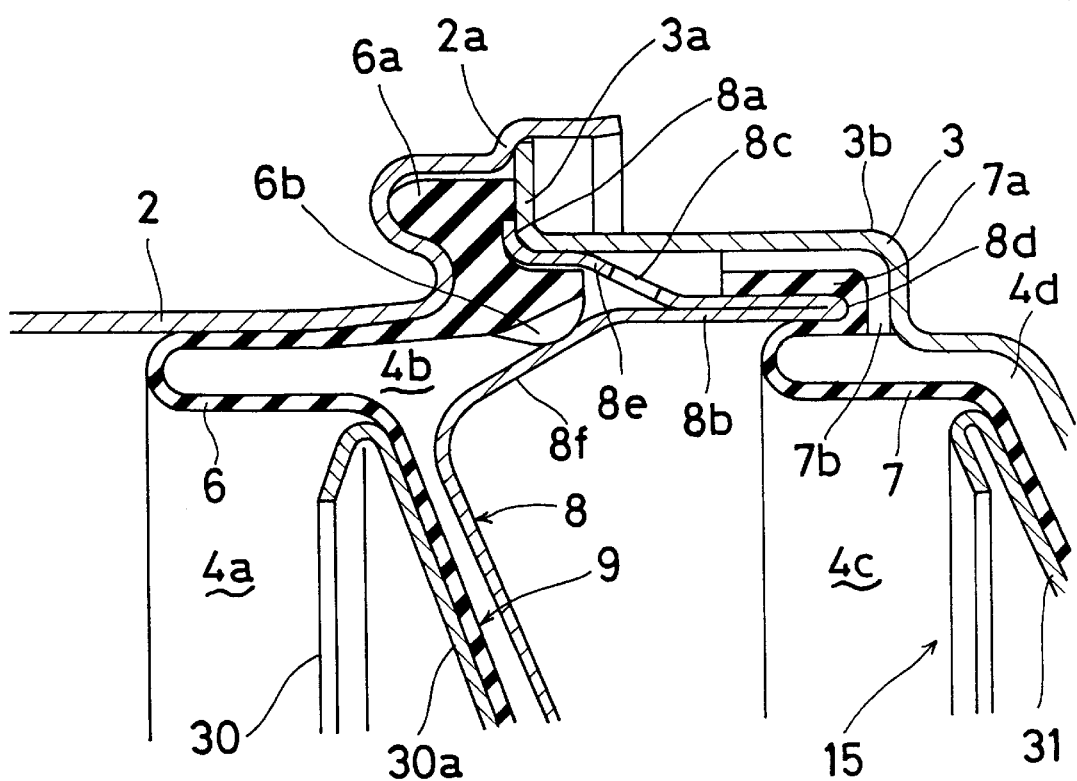
FIG. 2 is a partly enlarged cross-sectional view of the outer peripheral end portion of the front diaphragm of the vacuum servo unit shown in FIG. 1.

As shown in more detail in FIG. 2, the outer circumferential end 3a of the rear shell 3 is in contact with a shoulder portion 2a of the front shell 2 so that the front and rear shells form the housing 4. The vacuum servo unit 1 also includes a plurality of stud bolts 5 installed on the rear shell 3 in the peripheral direction at regular intervals. The stud bolts 5 are adapted to be inserted through the dash panel (not shown) of a vehicle to fix the vacuum servo unit 1 to the vehicle.

As illustrated in FIG. 1 and FIG. 2, a front movable wall member 9 and a rear movable wall member 15 are provided in the housing 4. A partition wall member 8 is also provided in the housing 4 between the front movable wall member 9 and the rear movable wall member 15. A movable power piston 16 made of a resin is inserted in the housing 2 from the open end portion of the rear shell 3.

The front movable wall member 9 includes a front diaphragm 6 and a front plate 30. The outer peripheral end portion 6a of the front diaphragm 6 is fixed between the front shell 2 and the rear shell 3.

As best shown in FIG. 2, the outer peripheral portion 8b of the partition wall member 8 comprises a first portion, a second portion and a third portion. The first portion extends towards the right in FIG. 2 so as to be parallel or generally parallel to the axis of the housing 4. One end of the second portion is connected to the end of the first portion and turns back upon the first portion at a bent portion 8d to extend towards the left in FIG. 2. One end of the third portion 8e is connected to the other end of the second portion and is inclined away from the first portion towards the left in FIG. 2 to form a sloping region. The third portion is connected to the radially outwardly directed outer peripheral end portion 8a of the partition wall member 8. By virtue of this construction, the first portion and the second portion of the partition wall member 8 generally overlap one another as illustrated in FIG. 2.

The outer peripheral end portion 8a of the partition wall member 8 is fixed between the outer peripheral end portion 6a of the front diaphragm 6 and the outer peripheral portion 3a of the rear shell 3. The partition wall member 8 also includes a slope portion 8f that supports the inner peripheral face of the outer peripheral end portion 6a of the front diaphragm 6.

The rear movable wall member 15 includes a rear diaphragm 7 and a rear plate 31. The outer peripheral end portion 7a of the rear diaphragm 7 is fixed between the bent portion 8d of the outer peripheral portion 8b of the partition wall member 8 and a stepped portion 3b of the rear shell 3.

The front plate 30 forming a part of the front movable wall member 9 includes a base portion 30a and a cylindrical portion 30b. The base portion 30a is shaped like a saucer and is provided on an output side face of the front diaphragm 6. The cylindrical portion 30b is disposed concentrically with the movable power piston 16 and extends from the inner peripheral end portion of the base portion 30a towards the input side, i.e., towards the right in FIG. 1.

The outer peripheral portion of the cylindrical portion 30b of the front plate 30 contacts in an air tight manner the inner peripheral portion of the front diaphragm 6. As explained later, the inner peripheral portion of the front plate 30 is connected in an air tight manner to the outer peripheral portion of the movable power piston 16.

The inner peripheral portion of the partition wall member 8 has an annular elastic member 32 as shown in FIG. 1. The outer peripheral portion of the cylindrical portion 30b of the front plate 30 contacts in an air tight manner the inner peripheral portion of the partition wall member 8 through the annular elastic member 32 so that the outer peripheral portion of the cylindrical portion 30b slides on the inner peripheral portion of the annular elastic member 32. Therefore, the partition wall member 8 is fixed in the housing 4.

Figure 3:
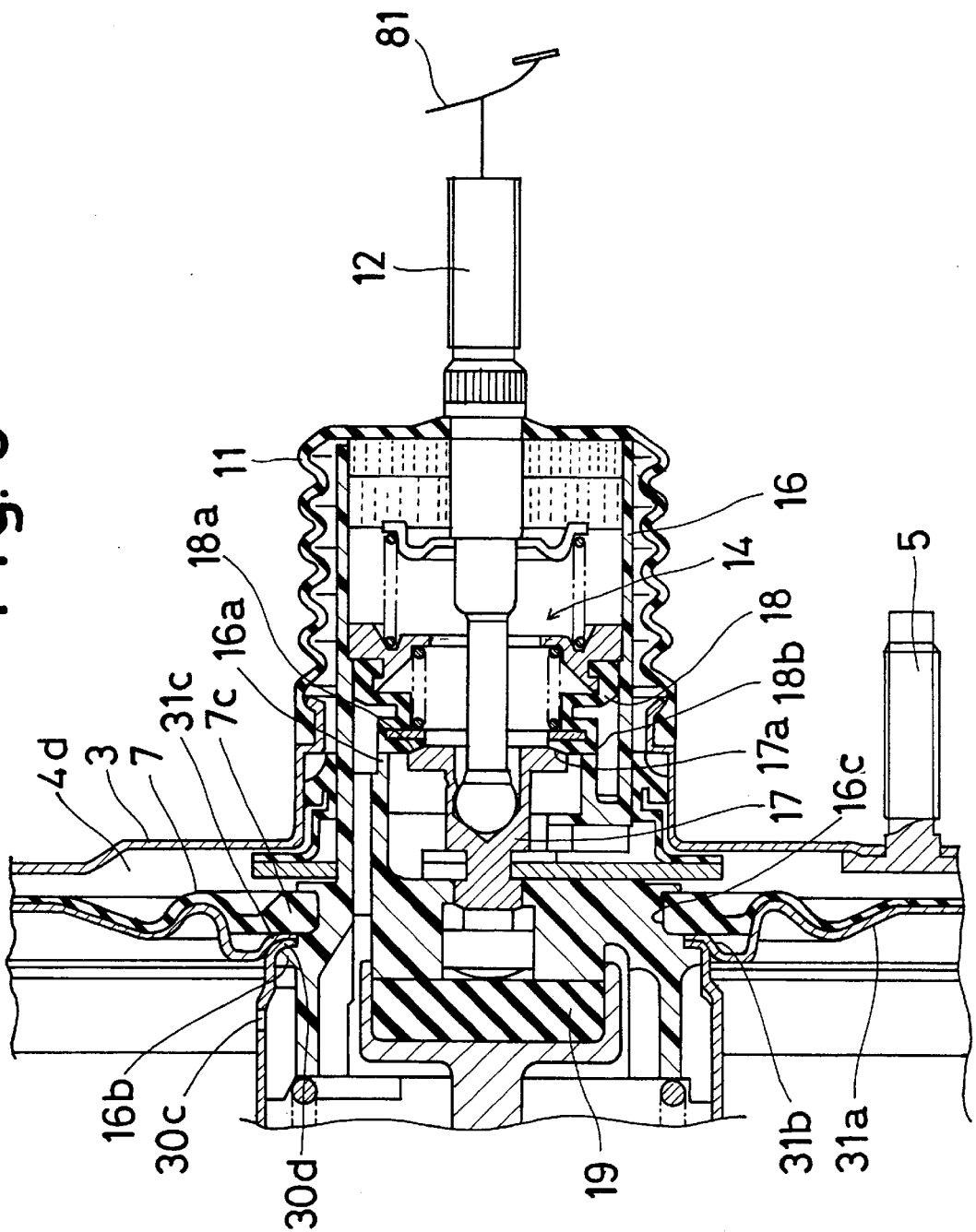
FIG. 3 is a partly enlarged cross-sectional view of a portion of the vacuum servo unit shown in FIG. 1.

As seen in FIG. 3, the rear plate 31 comprises a base portion 31a and a cylindrical portion 31b. The base portion 31a is shaped like a saucer and is provided on the output side face of the rear diaphragm 7. The cylindrical portion 31b extends from the inner peripheral end portion of the base portion 31a towards the input side, i.e., to the right in FIG. 3. The cylindrical portion 31b of the rear plate 31 is disposed concentrically with the movable power piston 16. As explained later, the inner peripheral portion of the rear plate 31 is connected in an air tight manner to the outer peripheral portion of the movable power piston 16.

FIG. 1 and FIG. 2 show the partition wall member 8 dividing the pressure chamber of the housing 4 into a front pressure chamber located in front of the partition wall member 8 and a rear pressure chamber located behind the partition wall member 8. The front movable wall member 9 divides the front pressure chamber into a front constant pressure chamber 4a located in front of the front movable wall member 8 and a front variable pressure chamber 4b located behind the front movable wall member 8. The rear movable wall member 15 divides the rear pressure chamber into a rear constant pressure chamber 4c located in front of the rear movable wall member 15 and a rear variable pressure chamber 4d located behind the rear movable wall member 15. These chambers 4a, 4b, 4c, 4d are divided by way of the partition wall member 8, the front movable wall member 9, and the rear movable wall member 15.

A plurality of communicating holes 8c, only one of which is shown in FIG. 2, are provided at the sloping third portion 8e of the outer peripheral portion 8b. The communicating holes 8c are disposed in the peripheral direction at regular intervals. A plurality of slits 6b, only one of which is shown in FIG. 2, are provided on the outer peripheral end portion 6a of the front diaphragm 6. The slits 6b, which form air paths, are disposed in the peripheral direction at regular intervals. A plurality of communicating paths 7b, only one of which is shown in FIG. 2, are provided on the outer peripheral portion 7a of the rear diaphragm 7. The communicating paths 7b are disposed in the peripheral direction at the regular intervals. The communicating paths 7a are generally L-shaped as seen in FIG. 2.

The communication between the front variable pressure chamber 4b and the rear variable pressure chamber 4d is permitted at all times by the communicating hole 8c, the path 6b, and the communicating path 7a. A space is provided between the outer peripheral portion 8b of the partition member 8 and the outer peripheral portion 7a of the rear diaphragm 7. It is through this space that the communicating holes 8c and the communicating paths 7b communicate with each other so that it is not necessary for the communicating holes 8c to face the communicating paths 7b. Further since the communicating holes 8c are disposed on the sloping third portion 8e of the outer peripheral portion 8b of the partition wall member 8, it is possible to enlarge the opening area of the communicating hole 8c. Thus, the responsiveness of the vacuum servo unit 1 is increased.

Referring to FIG. 1, several air holes 30c, only one of which is illustrated, are provided on the cylindrical portion 30b of the front plate 30 of the front movable wall member 9. The air holes 30c are disposed in the peripheral direction of the cylindrical portion 30b at regular intervals. The air holes 30c maintain communication between the front constant pressure chamber 4a and the rear constant pressure chamber 4c. The front constant pressure chamber 4a is adapted to communicate with a negative pressure source 82, such as an intake manifold of an internal combustion engine, through an inlet 13 provided on the front shell 2. As a result, the front constant pressure chamber 4a and the rear constant pressure chamber 4c are constantly under negative pressure.

With reference to FIG. 1, a cover 11 is provided on the outer peripheral portion of the movable power piston 16 to prevent dust and the like from infiltrating the housing 4. An output rod 10 is provided in front of the movable power piston 16, and the output rod 10 extends through the front shell 2 to engage a piston of the master cylinder. A reaction disc 19 is provided between the movable power piston 16 and the output rod 10.

As seen in FIG. 3, an input member 17 and a control valve 18 are provided in the movable power piston 16. A control valve mechanism 14 is also formed in the movable power piston 16. The control valve mechanism 14 includes an annular atmosphere controlling valve seat 17a, an annular negative pressure controlling valve seat 16a, an atmosphere controlling seal portion 18a of the control valve 18, and a negative pressure controlling seal portion 18b of the control valve 18.

An input rod 12 whose right end portion is connected with a brake operation member, for example a brake pedal 81, is inserted in the movable power piston 16. The input rod 12 is connected with the input member 17 so that the two are capable of moving as one unit.

Figure 4:
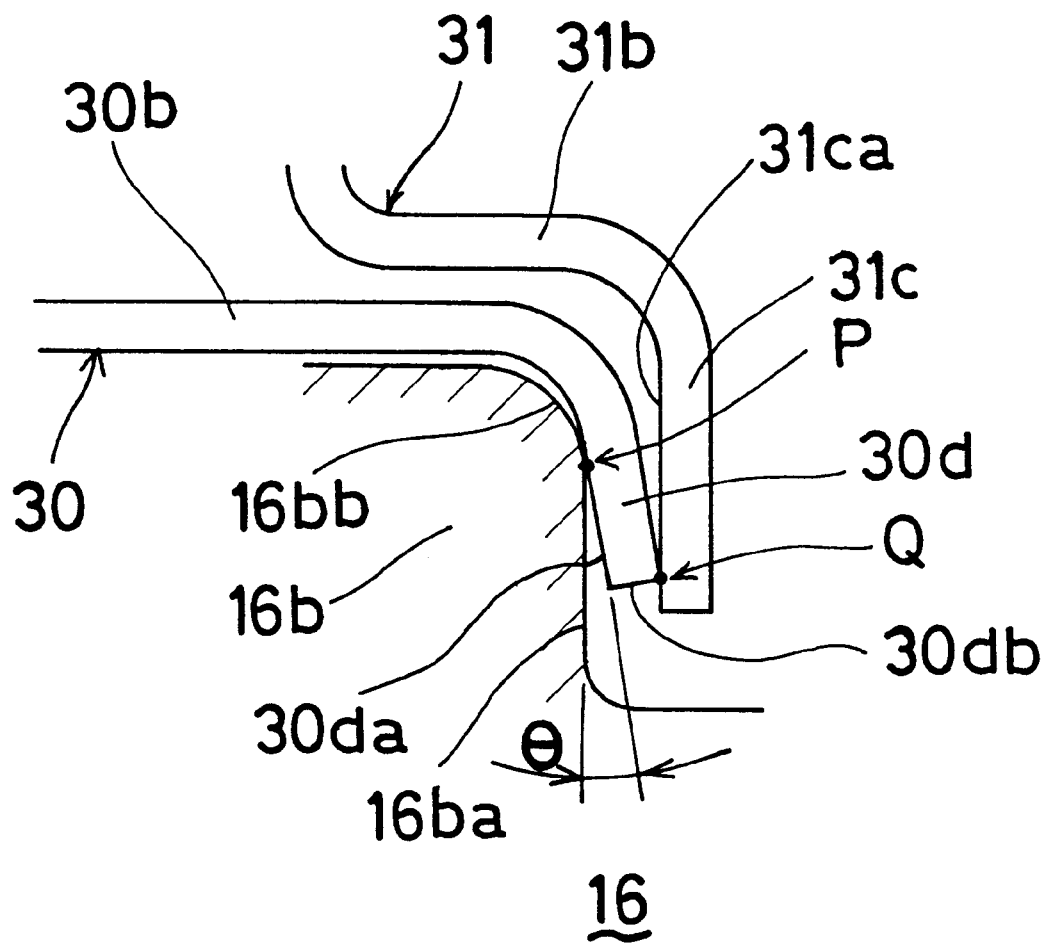
FIG. 4 is a partly enlarged cross-sectional view of the portion of the vacuum servo unit identified as detail "A" in FIG. 1.

FIG. 4 illustrates that the outer peripheral portion of the movable power piston 16 is provided with a supporting portion 16b. The supporting portion 16b of the movable power piston 16 is in the form of an annular flange. An input side face 16ba of the supporting portion 16b is perpendicular or substantially perpendicular to the axis of the movable power piston 16. An outer peripheral portion 16bb of the input side face 16ba of the supporting portion 16b is rounded.

The input side end portion of the cylindrical portion 30b of the front plate 30 is provided with a first engaging portion 30d. The first engaging portion 30d is shaped in the manner shown in FIG. 5. That is, the cylindrical part of the cylindrical portion 30b merges into a rounded or curved part 30e. The curved part 30e merges into a generally straight part 30f. It can be seen, therefore, that the diameter (inner and outer) of the first engaging portion 30d decreases towards the input side (i.e., towards the right in FIG. 4) along the axial length of the first engaging portion 30d.

A second engaging portion 31c is disposed at the input side end portion of the cylindrical portion 31b of the rear plate 31. The second engaging portion 31c extends generally radially inwardly from the input side end portion of the cylindrical portion 31b so that it is oriented parallel or substantially parallel to the input side face 16ba of the supporting portion 16b of the power piston 16. The output side face 30da of the first engaging portion 30d contacts the outer peripheral portion 16bb of the input side face 16ba of the supporting portion 16b at a first contact portion P. The first contact portion P forms a generally ring shaped line of contact.

The first engaging portion 30d is surrounded by the cylindrical portion 31b of the rear plate 31 over a preset interval. The output side face 31ca of the second engaging portion 31c contacts the corner of the inner peripheral edge portion 30db of the first engaging portion 30d. This forms a second contact portion Q between the output side face 31ca of the second engaging portion 31c and the inner peripheral edge portion 30db. The second contact portion Q is a ring shaped line of contact. The first contact portion P and the second contact portion Q are disposed concentrically with respect to one another, and the diameter of the second contact portion Q is smaller than that of the first contact portion P. That is, the first contact portion P is located at a position radially outwardly with respect to the movable power piston 16 relative to the second contact portion Q. An angle θ formed by the input side face 16ba of the supporting portion 16b and the output side face 30da of the first engaging portion 30d is about 8.5 degrees.

As can also be seen from FIG. 4, the configuration of the first engaging portion 30d is such that the input side face of the first engaging portion 30d is spaced from the output side face 31ca of the second engaging portion 31c in the region directly opposite the first contact portion P. Similarly, the output side face 30da of the first engaging portion 30d is spaced from the input side face 16ba of the supporting portion 16b in the region directly opposite the second contact portion Q. Indeed, the output side face 30da of the first engaging portion 30d is spaced from the input side face 16ba of the supporting portion 16b between the first contact portion P and the inner peripheral edge portion 30db. Thus, between the two ring shaped lines of contact defined by the first and second contact portions P, Q, the first engaging portion 30d is spaced from the input side face 16ba of the supporting portion 16b and the output side face 31ca of the second engaging portion 31c.

With reference to FIG. 3, the inner, peripheral portion 7c of the rear diaphragm 7 is engaged in an air tight manner with an annular groove 16c of the movable power piston 16. Thus, the first engaging portion 30d and the second engaging portion 31c are sandwiched between the supporting portion 16b and the inner peripheral portion 7c of the rear diaphragm 7. In this way, the inner peripheral portions of the front and rear plate are engaged with the outer peripheral portion of the movable power piston 16.

As shown in FIG. 1, a return spring 20 is provided between the front end portion of the movable power piston and the front shell 2 to bias the movable power piston 16 towards the rear shell 3, i.e., towards the right in FIG. 1. The return spring 20 is located within the cylindrical portion 30b of the front plate 30, and a preset interval or distance is provided between the outer peripheral portion of the return spring 20 and the inner peripheral portion of the cylindrical portion 30b. This prevents the return spring 20 and the inner peripheral portion of the cylindrical portion 30b from interfering with each other.

The input side end portion 20a of the return spring 20 extends radially inwardly so that the input side end portion 20a can engage a base portion 10a of the output member 10. Thus, the output member 10 is prevented from coming off the movable power piston 16.

The operation of the vacuum servo unit 1 of the present invention is as follows. When the brake pedal 81 is actuated by the driver, the input rod 12 connected with the brake pedal 81 receives the brake operation force and moves towards the left as seen in FIG. 1. The input member 17 fixed to the input rod 12 also moves with the input rod 12 towards the left in FIG. 1.

The atmosphere controlling seal portion 18a and the negative pressure controlling seal portion 18b of the control valve 18 also are moved towards the left with the input member 17 according to the movement of the input member 17 by virtue of the biasing force of a valve spring. The negative pressure controlling seal portion 18b contacts the negative pressure controlling valve seat 16a of the movable power piston 16, which cuts off the communication between the variable pressure chambers 4b, 4d and the constant pressure chambers 4a, 4c. Therefore, communication between the variable pressure chambers 4b, 4d and the negative pressure source 82 ceases.

As the input member 17 moves further towards the left in FIG. 3, the engagement between the atmosphere controlling valve seat 17a and the atmosphere controlling seal portion 18a ceases so that the variable pressure chambers 4b, 4d communicate with the atmosphere. Therefore, a pressure differential is generated between the constant pressure chambers 4a, 4c and the variable pressure chambers 4b, 4d by the inflow of atmospheric air into the variable pressure chambers 4b, 4d. The movable wall members 9, 15 receive the load force created by the pressure differential, and the movable power piston 16 connected with the movable wall members 9, 15 supplies amplified brake force to the output rod 10 through the reaction disc 19. The output rod 10 outputs a propulsion force on the movable power piston 16, i.e., the amplified brake force to outside the vacuum servo unit 1.

When the driver judges that there is no need for a brake operation and the brake pedal 81 is released, the input member 17 moves towards the right in FIG. 3 according to the returning movement of the input rod 12. The atmosphere controlling valve seat 17a thus contacts the atmosphere controlling seal portion 18a and this cuts off communication between the variable pressure chambers 4b, 4d and the atmosphere. As the input member 17 moves further towards the right, the end portion of the control valve 18 is pushed by the input member 17 to also move towards the right in cooperation with the input member 17. Accordingly, the negative pressure controlling seal portion 18b brakes away from the negative pressure controlling valve seat 16a. Thus, the variable pressure chambers 4b, 4d once again communicate with the constant pressure chambers 4a, 4c. As a result, the atmospheric air in the variable pressure chambers 4b, 4d flows into the constant pressure chambers 4a, 4c. Therefore, the degree of aggressive pressure in the variable pressure chambers 4b, 4d decreases and the servo force to the power piston 10 decreases. The movable power piston 16 and the input rod 12 are returned to the initial position by the biasing force of the return spring 20 and the reaction force from the master cylinder.

With the engagement between the movable power piston 16 and the front plate 30 of the front movable wall member 9 and with the engagement between the front plate 30 of the movable wall member 9 and the second plate 31 of the rear movable wall member 15 as shown in FIG. 4, since the front movable wall member 9 (i.e., the front plate 30) is engaged with the supporting portion 16b of the movable power piston 16 by virtue of the contact between the input side face 16ba of the supporting portion 16b and the output side face 30da of the first engaging portion 30d, a large load is not generated in the front plate 30. Also, since the first contact portion P is located at an outer position in the radial direction of the movable power piston 16 with respect to the second contact portion Q, the load of the front plate 30 is decreased. Further, since the angle θ formed by the input side face 16ba of the supporting portion 16b and the output side face 30da of the first engaging portion 30d is about 8.5 degrees, the load of the front plate 30 is decreased.

By virtue of the construction of the vacuum servo unit 1 as described above, the durability of the front plate 30 is advantageously increased.

Figure 5:
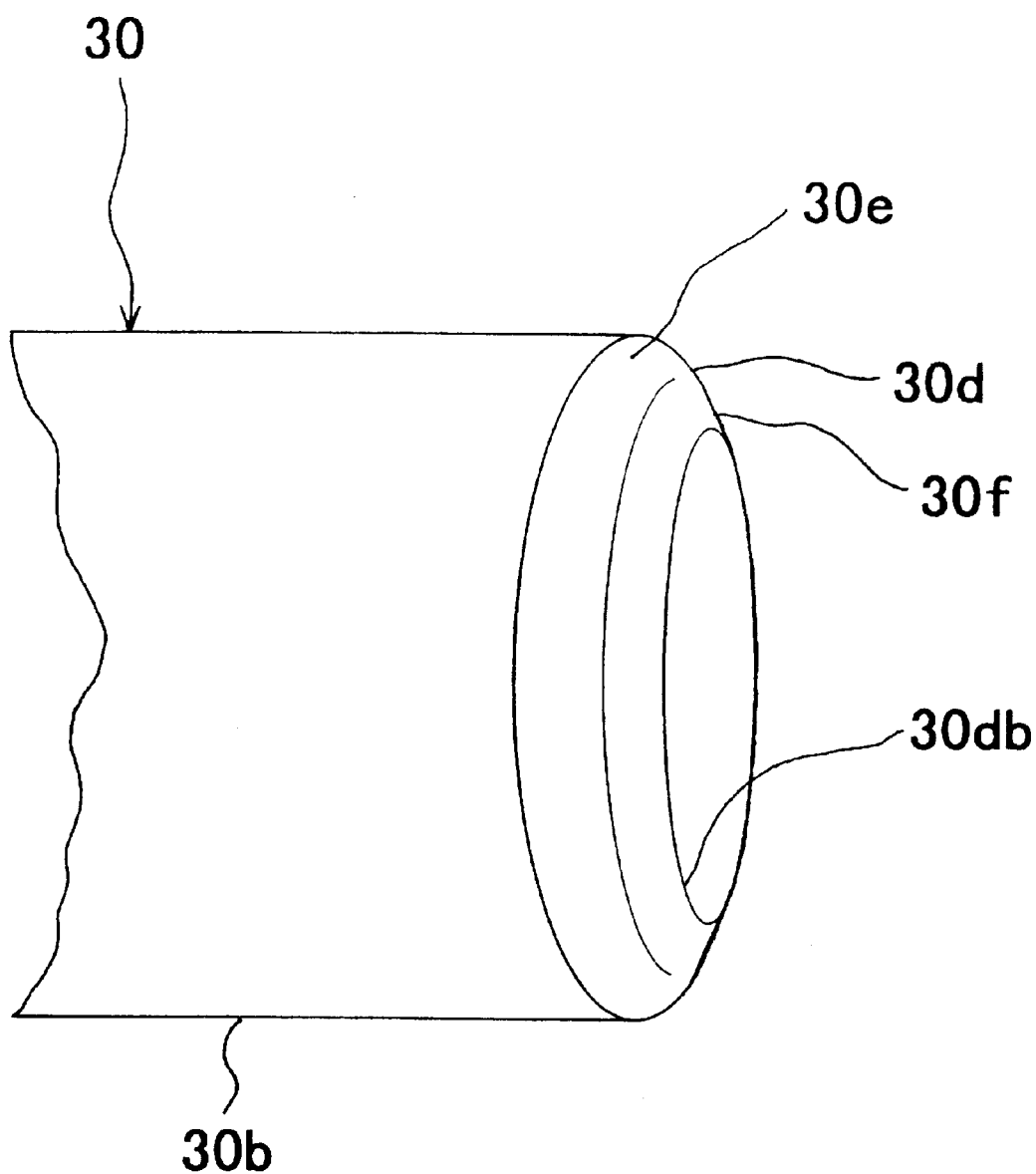
FIG. 5 is a perspective view of an end portion of the cylindrical portion of the front plate.

In the embodiment described above, the first engaging portion 30*d* is configured in the manner shown in FIG. 5. However, it is to be understood that the first engaging portion 30*d* is not limited to this specific shape.

Additionally, while the second engaging portion 31*c* is described and illustrated as being straight, the second engaging portion 31*c* is not limited to this shape.

The principles, preferred embodiments and mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A tandem vacuum servo unit for a vehicle braking system having an input side at which a force is inputted and an output side at which a force is outputted comprising:

a housing in which is defined a pressure chamber, a partition wall member provided in said housing to divide said pressure chamber into a front pressure chamber and a rear pressure chamber, the partition wall member having an outer peripheral portion that is fixed in an air tight manner to said housing;

a movable power piston having an outer peripheral portion;

a supporting portion provided on said outer peripheral portion of said movable power piston;

a front movable wall member disposed concentrically with said partition wall member in said front pressure chamber to divide said front pressure chamber into a front constant pressure chamber and a front variable pressure chamber, said front constant pressure chamber being communicable with a negative pressure source, and said front variable pressure chamber being selectively communicable with atmosphere and the negative pressure source;

a first engaging portion disposed at an inner peripheral portion of said front movable wall member, said first engaging portion having an output side face engaging said supporting portion along a first contacting portion, said first engaging portion being configured so that an inner peripheral end of said first engaging portion is inclined towards the input side;

a rear movable wall member disposed concentrically with said partition wall member in said rear pressure chamber to divide said rear pressure chamber into a rear constant pressure chamber and a rear variable pressure chamber, said rear constant pressure chamber being communicable with the negative pressure source, and said rear variable pressure chamber being selectively communicable with atmosphere and the negative pressure source, said rear movable wall member having an inner peripheral portion;

a second engaging portion disposed at the inner peripheral portion of said rear movable wall member and engaged with an input side face of said first engaging portion along a second contacting portion, the first contacting portion being located radially outwardly of said second contacting portion;

an input member disposed in said movable power piston and being axially movable upon brake actuation;

an output member for outputting a propulsion force generated by said movable power piston accompanying movement of said front and rear movable wall members; and a control member for selectively communicating said front and rear variable pressure chambers with said negative pressure source or with the atmosphere according to movement of said input member against said movable power piston.

2. A tandem vacuum servo unit as claimed in claim 1, wherein said front movable wall member has a front diaphragm and a front plate, said front diaphragm being connected in an air tight manner with said housing at an outer peripheral portion of the front diaphragm, said front plate being disposed on an output side face of said front diaphragm, said first engaging portion being provided at an inner peripheral portion of the front plate.

3. A tandem vacuum servo unit as claimed in claim 2, wherein said rear movable wall member has a rear diaphragm and a rear plate, said rear diaphragm being connected in an air tight manner with said housing at an outer peripheral portion of the rear diaphragm, said rear plate being disposed on an output side face of said rear diaphragm, said second engaging portion being provided at an inner peripheral portion of the rear plate.

4. A tandem vacuum servo unit as claimed in claim 2, wherein said front plate comprises a base portion provided on said output side face of said front diaphragm and a cylindrical portion disposed concentrically with said movable power piston to extend towards an input side from an inner peripheral portion of said base portion, said first engaging portion being provided with an input side portion of said cylindrical portion, and said inner peripheral portion of said partition wall member contacting in an air tight manner an outer peripheral portion of said cylindrical portion of said front plate so that said movable power piston slides on said inner peripheral portion of said partition wall member through said cylindrical portion of said front plate.

5. A tandem vacuum servo unit as claimed in claim 1, wherein said supporting portion is an annular flange portion of said movable power piston.

6. A tandem vacuum servo unit as claimed in claim 1, wherein an outer peripheral end portion of an input side face of said supporting portion is rounded.

7. A tandem vacuum servo unit as claimed in claim 1, wherein said second contacting portion is a portion between said input side face of said first engaging portion and an output side face of said second engaging portion.

8. A tandem vacuum servo unit as claimed in claim 1, wherein said movable power piston includes an axis, an input side face of said supporting portion being substantially perpendicular to an the axis of said movable power piston, said input side face of said supporting portion and said output side face of said first engaging portion forming an angle of about 8.5 degrees.

9. A tandem vacuum servo unit for a vehicle braking system comprising:

a housing in which is defined a pressure chamber, a partition wall member provided in said housing to divide said pressure chamber into a front pressure chamber and a rear pressure chamber, the partition wall member having an outer peripheral portion that is fixed in an air tight manner to said housing;

a movable power piston having an outer peripheral portion provided with a supporting portion;

a front movable wall member disposed in said front pressure chamber to divide said front pressure chamber into a front constant pressure chamber communicable with a negative pressure source and a front variable pressure chamber selectively communicable with atmosphere and the negative pressure source;

a first engaging portion disposed at an inner peripheral portion of said front movable wall member, said first engaging portion having an input side face and an output side face, said output side face of the first engaging portion engaging said supporting portion along a first contacting portion, the first engaging portion terminating at an inner peripheral edge;

a rear movable wall member disposed in said rear pressure chamber to divide said rear pressure chamber into a rear constant pressure chamber communicable with the negative pressure source and a rear variable pressure chamber selectively communicable with atmosphere and the negative pressure source, said rear movable wall member having an inner peripheral portion;

a second engaging portion disposed at the inner peripheral portion of said rear movable wall member, a portion of the second engaging portion being engaged with the input side face of said first engaging portion, said first engaging portion being spaced from the supporting portion at a region between the first contacting portion and the inner peripheral edge of the first engaging portion;

an axially movable input member disposed in said movable power piston;

an output member for outputting a propulsion force generated by said movable power piston accompanying movement of said front and rear movable wall members; and a control member for selectively communicating said front and rear variable pressure chambers with said negative pressure source or with the atmosphere according to movement of said input member against said movable power piston.

10. A tandem vacuum servo unit as claimed in claim 9, wherein said supporting portion is an annular flange portion of said movable power piston.

11. A tandem vacuum servo unit as claimed in claim 9, wherein an outer peripheral end portion of an input side face of said supporting portion is rounded.

12. A tandem vacuum servo unit as claimed in claim 9, wherein said second engaging portion engages the input side face of said first engaging portion along a second contacting portion, said second contacting portion being between a part of the first engaging portion adjacent said inner peripheral edge of said first engaging portion and an output side face of said second engaging portion.

13. A tandem vacuum servo unit as claimed in claim 9, wherein said front movable wall member has a front diaphragm and a front plate, said front diaphragm being connected in an air tight manner with said housing at an outer peripheral portion of the front diaphragm, said front plate being disposed on an output side face of said front diaphragm, said first engaging portion being provided at an inner peripheral portion of the front plate.

14. A tandem vacuum servo unit as claimed in claim 9, wherein said rear movable wall member has a rear diaphragm and a rear plate, said rear diaphragm being connected in an air tight manner with said housing at an outer peripheral portion of the rear diaphragm, said rear plate being disposed on an output side face of said rear diaphragm, said second engaging portion being provided at an inner peripheral portion of the rear plate.

15. A tandem vacuum servo unit as claimed in claim 9, wherein said power piston includes an axis, an input side face of said supporting portion being substantially perpendicular to the axis of said movable power piston, said input side face of said supporting portion and said output side face of said first engaging portion forming an angle of about 8.5 degrees.

16. A tandem vacuum servo unit as claimed in claim 9, wherein said second engaging portion engages the input side face of said first engaging portion along a second contacting portion, said first contacting portion being located radially outwardly of the second contacting portion.

* * * * *